June 22, 1937.  M. L. CRANDALL  2,084,480

SAFETYPIN

Filed April 5, 1935

Inventor
Merton L. Crandall
By Beaman & Langford
Attorney

Patented June 22, 1937

2,084,480

UNITED STATES PATENT OFFICE 2,084,480

SAFETY PIN

Merton L. Crandall, Jackson, Mich.

Application April 5, 1935, Serial No. 14,872

16 Claims. (Cl. 24—161)

This invention relates to safety pins, and more particularly to a safety pin in the normal position of which the sharpened end of the pin is disposed behind a protecting shield.

The common safety pin, of which there is practically only one type on the market today, constitutes an ever present source of danger due to the outwardly projecting pin portion when in an open position, and as is well known, they are not infrequently swallowed when in an open position by young children. When an open safety pin is disposed in the throat or internal organs of a child, it becomes firmly embedded in the surrounding tissues, making a serious operation necessary for its removal.

According to the present invention, the normal open position of the sharpened end of the pin is such that the pin portion is shielded and if the pin is accidentally swallowed by a child, it may pass entirely through the child without danger of becoming caught, regardless of which end is swallowed first. Another particularly advantageous feature of the present invention resides in the normal closed unstressed position of the sharpened end of the pin. In this position the sharpened end of the pin is also shielded so that if the pin is partially or wholly open while in clothing, the point will be shielded, preventing the wearer of the clothing from being pricked or gouged.

Specifically, the invention resides not only in providing a safety pin, in which in normal open position the sharpened end of the pin is inwardly disposed, but also in the provision of a recessed head for receiving the sharpened point in normally open position, and is an improvement over Patent 1,774,083 to Colby.

An object of the invention, therefore, is to provide a safety pin having a point which in normal open position is shielded.

Another object of the invention is to provide a safety pin having a guarding head provided with a shielding recess for the point in normal open position.

A further object of the invention is to provide a safety pin having a guarding head with opposed portions of side plates inwardly bent for providing a restricted pin receiving throat between them.

Figure 1:
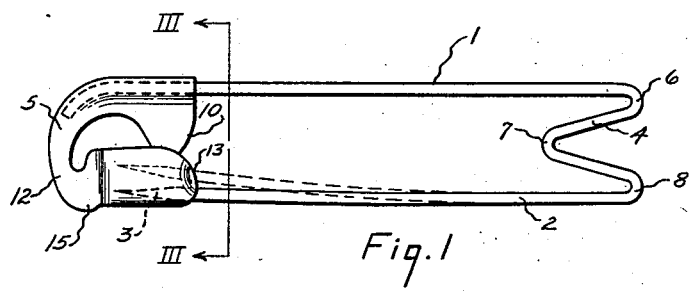
Figure 2:
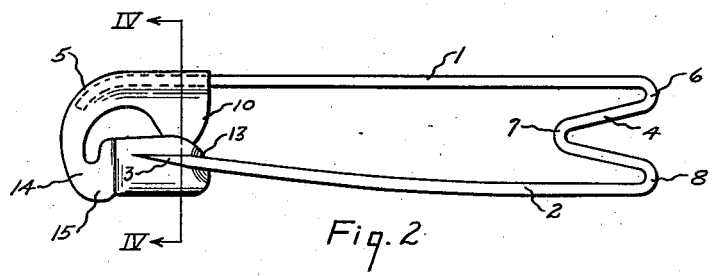
Figure 3:
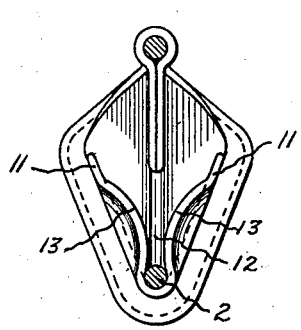
Figure 4:
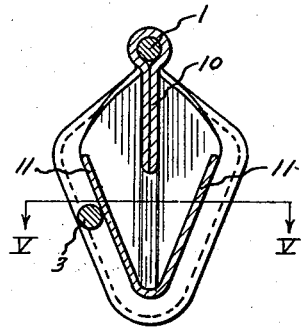
Figure 5:
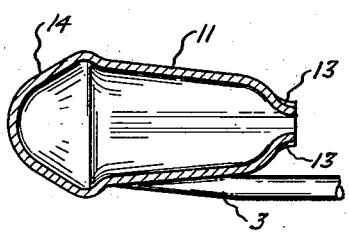

These and other objects will be apparent from the following specifications, when taken with the accompanying drawing, in which Fig. 1 is a side elevation of the invention showing the safety pin in a closed position, Fig. 2 is a view corresponding to Fig. 1 showing the safety pin in an open position, Fig. 3 is a section taken on the line III—III of Fig. 1, Fig. 4 is a section taken on the line IV—IV of Fig. 2, and Fig. 5 is a section taken on the line V—V of Fig. 4.

Referring particularly to Fig. 1 of the drawing, reference character 1 indicates a body of the improved safety pin according to this invention having a pin 2 with a sharpened end 3. The body 1 and the pin 2 are connected at one end by a resilient loop 4. A guard 5 is secured to the free end of the body 1. The resilient loop 4 and the pin 2 are all formed from a resilient wire such as piano wire, and the bends 6, 7, and 8, comprising portions of the resilient loop 4 are formed by bending the wire, as distinguished from drawing. The bending of the wire does not reduce the resilient characteristics of the loop 4, while drawing would so change the structure of the material that the resiliency would be insufficient for the purposes of the invention.

The guard 5 is made of thin sheet metal generally of channel form, and at its point of attachment to the body 1 has a depending guiding tongue 10. The lower portion of the guard 5 comprises a V-shaped trough 11, the bottom curvature of which has a radius substantially equal to that of the pin 2. In normal closed position the pin 2 is disposed within the bottom of the channel 11, and is maintained therein by a resilient throat 12, shown particularly in Fig. 3 formed by slightly pinching in the ends of the channel 11 to form inwardly deflected portions 13. In this position the pin is stressed. However, even if the pin be accidentally removed from behind the deflected portions 13 into unstressed position, it will still be within the walls of the channel 11 in a position corresponding to the open unstressed position illustrated in Fig. 2 and shown in dotted lines in Fig. 1. On the opposite end of the trough 11 the guard 5 bulges outwardly into a protecting head 14. In manufacture the trough 11 is provided with its configuration by depressing the sides thereof inwardly from a wider trough originally having a width somewhat equal to the widest part of the head 14.

The resilient loop 4 connecting the body 1 and the pin 2 is characterized by the fact that in normal open position the sharpened end 3 of the pin 2 is disposed against one side or the other of the trough 11 substantially midway between the top and bottom thereof. By normal open position in the claims is meant any open position wherein the pin 2 is manually unstressed. Reference to Fig. 5 will disclose that the head 14 shields the sharpened end of the pin 3 in such a manner that the sharpened end 3 is entirely protected so that if, for instance, a child swallowed the safety pin of this invention while open, the guard portion going first, the pin would pass entirely through the child's body without harm to the child. The same result would occur if the loop 4 end of the pin were swallowed first. Further reference to Fig. 5 also indicates that the trough 11 is tapered somewhat in the direction of the loop 4 in order that the sharpened end 3 of the pin 2 may rest snugly thereagainst.

In the event that the sharpened end 3 of the pin in open position should rest directly on the bottom of the trough 11, the head 14 is provided with a depending bulge 15 to shield the sharpened end of the pin in the same manner as it is shielded when disposed at either side of the trough 11.

A further particularly advantageous feature of this invention resides in the loop 4. As is well known, the common safety pin which is most widely in use today is provided with a loop which, although shielded, frequently catches in clothing and cannot be removed without breaking the thread or the portion of the clothing in which it is caught. The present loop being of the form of a V extending inwardly and in the plane of the body 1, the pin 2 provides not only an exceedingly resilient construction, but also will not catch in loose threads or other portions of garments as does the usual resilient connection between the body and the pin of known safety pins.

Having thus described by invention, what I desire to secure by Letters Patent and claim is:

1. A safety pin comprising a body and a sharpened pin, said body and pin being connected by resilient means for urging said body and pin into a predetermined spaced relationship, and a guard carried by said body defining a hollow interior for receiving the sharpened end of the pin in closed position, said guard having on the exterior thereof means arranged for shielding the sharpened end of the pin in all normal open positions.

2. A safety pin, comprising a body and a sharpened pin, said body and pin being connected by resilient means for urging said body and pin into a predetermined spaced relationship, a guard carried by said body for shielding the sharpened end of said pin in closed position and in normal open position, and means defined on the exterior of said guard for receiving the sharpened end of said pin, said pin being characterized by the fact that in all normal open positions its sharpened end is resiliently urged into said means defined by said guard.

3. A safety pin, comprising a body and a sharpened pin, said body and said pin being connected by resilient means for urging said body and pin into a predetermined spaced relationship, a sheet metal guard carried by said body for shielding the sharpened end of said pin in closed position and in normal open position, and an external depression in said guard for receiving and providing an abutment in front of the sharpened end of said pin, said pin being characterized by the fact that in its normal open position its sharpened end is disposed in said depression.

4. A safety pin, comprising a body and a sharpened pin, said body and said pin being connected by resilient means for urging said body and pin into a predetermined spaced relationship, a sheet metal guard carried by said body for shielding the sharpened end of said pin in closed position and in normal open position, means defined on the exterior of said guard for receiving the sharpened end of said pin, said pin being characterized by the fact that in all normal open positions the sharpened end is resiliently urged into said means, and means defined in the interior of said guard for receiving the sharpened end of said pin in closed position.

5. A safety pin, comprising a body and a sharpened pin, said body and said pin being connected by resilient means for urging said body and pin into a predetermined spaced relationship, a guard carried by said body for shielding the sharpened end of said pin in closed position and in normal open position, means defined on the exterior of said guard for receiving the sharpened end of said pin, said last named means including an abutment in front of said sharpened pin end, said pin being characterized by the fact that in its normal open position the sharpened end is disposed in said means, and means defined by said guard for resiliently engaging the sharpened end of said pin in closed position.

6. A safety pin, comprising a body and a sharpened pin, said body and said pin being connected by resilient means for urging said body and pin into a predetermined spaced relationship, a sheet metal guard carried by said body for shielding the sharpened end of said pin in closed position and in normal open position, an external depression in said guard for receiving the sharpened end of said pin and providing an abutment in front of the sharpened end of said pin, said pin being characterized by the fact that in its normal open position the sharpened end is disposed in said depression, and means defined by said guard for receiving the sharpened end of said pin in closed position.

7. A safety pin, comprising a body and a sharpened pin, said body and said pin being connected by resilient means for urging said body and pin into a predetermined spaced relationship, a guard carried by said body for shielding the sharpened end of said pin in closed position and in normal open position, an external depression defined by said guard for receiving the sharpened end of said pin and providing an abutment in front of the sharpened end of said pin, said pin being characterized by the fact that in its normal open position the sharpened end is disposed in said depression, and a restricted throat defined by said guard for resiliently receiving the sharpened end of said pin in closed position.

8. A safety pin, comprising a body and a sharpened pin, said body and said pin being connected by resilient means for urging said body and pin into a predetermined spaced relationship, and a sheet metal guard carried by said body for shielding the sharpened end of said pin in closed position and in normal open position, said pin being characterized by the fact that in its normal open position the sharpened end is contiguous with said guard, and said guard being characterized by the fact that it has on the exterior thereof a bulged end overlapping the sharpened end of said pin when disposed in normal open position.

9. A safety pin, comprising a body and a sharpened pin, said body and said pin being connected by resilient means for urging said body and pin into a predetermined spaced relationship, and a sheet metal guard carried by said body for shielding the sharpened end of said pin in closed position and in normal open position, said pin being characterized by the fact that in its normal open position the sharpened end is disposed contiguous with said guard, and said guard being characterized by the fact that it has on the exterior thereof a bulged end overlapping the sharpened end of said pin when disposed in normal open position.

10. A safety pin, comprising a body and a sharpened pin, said body and said pin being connected by resilient means for urging said body and pin into a predetermined spaced relationship, and a guard carried by said body for shielding the sharpened end of said pin in closed position and in normal open position, said pin being characterized by the fact that in its normal open position the sharpened end is disposed contiguous with said guard, and said guard being characterized by the fact that it has on the exterior thereof a bulged end overlapping the sharpened end of said pin when disposed in normal open position, and also by the fact that it has a restricted throat for resiliently receiving the sharpened end of said pin in closed position.

11. A safety pin, comprising a body and a sharpened pin, said body and said pin being connected by resilient means for urging said body and said pin into a predetermined spaced relationship, a sheet metal guard carried by said body for shielding the sharpened end of said pin in closed position and in its normal open position, a restricted throat for receiving the sharpened end of said pin in closed position, an external depression in said guard defined by said guard for receiving the sharpened end of said pin, said pin being characterized by the fact that in its normal open position its sharpened end is disposed in said depression, and a bulged end defined on the exterior of said guard adjacent said depression and overlapping the sharpened end of said pin when the same is in normal open position.

12. A safety pin, comprising a body and a sharpened pin, said body and said pin being connected by resilient means for urging said body and pin into a predetermined spaced relationship, a guard carried by said body for shielding the sharpened end of said pin in closed position and in normal open position, means defined by said guard for receiving the sharpened end of said pin, said pin being characterized by the fact that in its normal open position its sharpened end is disposed in said means defined by said guard, a restricted throat defined by said guard for resiliently receiving the sharpened end of said pin in closed position, and a shield defined on the exterior of said guard adjacent said means defined by said guard, overlapping the sharpened end of said pin when the same is in normal open position.

13. A safety pin, comprising a body and a sharpened pin substantially disposed in a single plane, said body and said pin being connected by resilient means for urging said body and said pin into a predetermined spaced relationship, said body, pin, and means being characterized by the fact that when said body and said pin are in said spaced relationship, said body, pin, and means are substantially unstressed in a direction parallel to said plane, and a guard carried by said body having a hollow interior in which the sharpened end of said pin is shielded while the same is in said predetermined spaced relationship to said body.

14. A safety pin, comprising a body portion having a guard at one end and a sharpened pin at the other, said guard having a substantially U-shaped sheet metal pin receiving portion, said pin being resiliently supported upon said body with the sharpened end contiguous with said guard, said pin in positions of minimum stress within or without said guard having the pointed end thereof shielded by said guard, said guard being provided with sharpened pin overlapping means for the purpose.

15. A safety pin, comprising a body and a sharpened pin, means resiliently urging said pin into a predetermined spaced relationship with said body, said means and pin being unstressed when said pin is in said predetermined spaced relationship to said body, and a sheet metal guard carried by said body, said guard having a hollow interior in which said pin is shielded when in said predetermined spaced relationship.

16. A safety pin, comprising a body and a sharpened pin, a sheet metal guard having an exterior outstanding abutment carried by said body, and means resiliently urging said pin against the outside surface of said guard and behind said abutment.

MERTON L. CRANDALL.